(12) United States Patent
Hironaka et al.

(10) Patent No.: US 8,058,604 B2
(45) Date of Patent: Nov. 15, 2011

(54) PICKING CART AND PICKING SYSTEM HAVING A DETERMINATION UNIT DETERMINES WHETHER OR NOT A STORAGE SHELF WHICH HAS BEEN DRAWN IS IDENTICAL TO THE DISPLAYED ONE BASED ON A DETECTION RESULT

(75) Inventors: Kazuyoshi Hironaka, Nagoya (JP); Tomonori Sumi, Nagoya (JP)

(73) Assignee: Kimura Unity Co., Ltd., Nagoya-shi (JP)

( * ) Notice: Subject to any disclaimer, the term of this patent is extended or adjusted under 35 U.S.C. 154(b) by 458 days.

(21) Appl. No.: 12/397,828

(22) Filed: Mar. 4, 2009

(65) Prior Publication Data

US 2010/0057245 A1 Mar. 4, 2010

(30) Foreign Application Priority Data

Aug. 26, 2008 (JP) ................................. 2008-216631

(51) Int. Cl.
*H01J 40/14* (2006.01)
(52) U.S. Cl. ..................................... 250/221; 250/559.4
(58) Field of Classification Search .................. 250/221, 250/214 R, 214.1, 559.4, 559.39, 559.44; 414/268–273, 298, 498; 340/568.1–568.5; 700/1.1, 317, 308; 209/702
See application file for complete search history.

(56) References Cited

U.S. PATENT DOCUMENTS 4,861,223 A * 8/1989 Olson .......................... 414/661

FOREIGN PATENT DOCUMENTS

JP 2002-362715 12/2002
* cited by examiner

*Primary Examiner* — Que T Le
(74) *Attorney, Agent, or Firm* — Oblon, Spivak, McClelland, Maier & Neustadt, L.L.P.

(57) ABSTRACT

A picking cart and a picking system capable of improving sorting precision and operating efficiency. The picking cart comprises a plurality of storage shelves at least one of which has a container placed thereon in a drawable manner, a display unit for displaying at least an article to be picked and one of the storage shelves to which the article is to be delivered, a sensor unit for detecting whether or not the container placed thereon has been drawn from each of the storage shelves, and a determination unit for determining whether or not one of the storage shelves from which the container placed thereon has been drawn is identical to the storage shelf displayed on the display unit, based on the detection result of the sensor unit. Before an article is placed in a container, that is, when a container is drawn, it is possible to know whether or not sorting has been carried out just as displayed.

8 Claims, 3 Drawing Sheets

PICKING CART AND PICKING SYSTEM HAVING A DETERMINATION UNIT DETERMINES WHETHER OR NOT A STORAGE SHELF WHICH HAS BEEN DRAWN IS IDENTICAL TO THE DISPLAYED ONE BASED ON A DETECTION RESULT

The present invention is based on Japanese Patent Application No. 2008-216631, filed on Aug. 26, 2008, the entire contents of which are incorporated herein by reference.

BACKGROUND OF THE INVENTION

1. Field of the Invention

The present invention relates to a picking cart and a picking system which are mainly used in logistics industry.

2. Description of the Related Art

A picking cart is a cart for storing picked articles in a storage space such as a container and transporting these articles. Some picking carts are provided with a plurality of containers for different destinations. For example, Japanese Unexamined Patent Publication No. 2002-362715 discloses a picking cart provided with a plurality of containers. This picking cart is equipped with sensors each disposed at sorting openings and can detect whether or not an article is placed through each sorting opening. If a worker places an article in a wrong container, the error is notified by an alarm sound or the like. Thus, sorting errors can be eliminated.

In this picking cart, however, the sensors detect whether or not an article is being placed in a container. Therefore, with this picking cart, it is impossible to verify whether sorting is correct or wrong until an article is placed in a container. Therefore, a worker who has made a sorting error recognizes the error after placing an article in a container and has to take the wrongly placed article out of the container. However, the container contains other articles which have been picked and sorted so far. Therefore, there is a fear that once mixed, the wrongly placed article cannot easily be taken out. Thus, there is a problem in terms of improving operating efficiency. There is also a fear that an article which is different from the wrongly placed article is taken out of the container. Thus, there is also a problem in terms of sorting accuracy.

SUMMARY OF THE INVENTION

The present invention has been made in view of the abovementioned circumstances, and it is an object of the present invention to provide a picking cart and a picking system capable of improving sorting accuracy and operating efficiency.

A picking cart of the present invention comprises a base having wheels on a lower part thereof, a plurality of storage shelves provided above the base, at least one of which is assigned with a container for storing a picked article and has the container placed thereon in a drawable manner, a display unit for displaying at least an article to be picked and one of the storage shelves to which the article is to be delivered, a sensor unit for detecting whether or not the container placed thereon has been drawn from each of the storage shelves, and a determination unit for determining whether or not one of the storage shelves from which the container placed thereon has been drawn is identical to the storage shelf displayed on the display unit, based on the detection result of the sensor unit.

A worker selects an article in accordance with display on the display unit. The worker draws a container in accordance with the display on the display unit and places the article in the drawn container.

In the present invention, the sensor unit detects whether or not the container placed thereon has been drawn from each of the storage shelves. The determination unit determines whether or not one of the storage shelves from which the container placed thereon has been drawn is identical to the storage shelf displayed on the display unit. According to the present invention, in a previous step to placing an article in a container, that is, at the time when a container is drawn, it is possible to know whether or not sorting has been carried out just as displayed. That is to say, whether there is a sorting error or not is determined before placing an article. Therefore, article misplacement by a worker can be prevented. According to the picking cart of the present invention, it is possible to improve sorting precision and operating efficiency.

Here, the sensor unit may be optical sensors respectively provided at the storage shelves. Providing an optical sensor at each of the storage shelves enables easy and effective detection of whether there is a draw or not.

It is preferable that each of the storage shelves is provided with a draw indicator for indicating whether the container placed thereon should be drawn or not, based on the storage shelf displayed on the display unit. Providing a draw indicator to each of the storage shelves enables a worker to easily confirm which storage shelf the container placed thereon should be drawn from. Accordingly, draw errors can also be prevented.

Furthermore, it is also possible to construct a picking system using the picking cart of the present invention. That is to say, the picking system of the present invention comprises the abovementioned picking cart, a server which stores article information and picking and sorting instruction information, and a client computer which transmits and receives data to and from the server, and the abovementioned display unit of the picking cart is a display unit of the client computer. According to the picking system of the present invention, it is possible to improve sorting precision and operating efficiency.

DESCRIPTION OF THE PREFERRED EMBODIMENT

Now, the present invention will be described in more detail by way of a preferred embodiment. A picking cart 1 of this preferred embodiment will be described referring to FIGS. 1 to 3. It is noted that FIG. 1 shows that a container X1 has been drawn.

Figure 1:
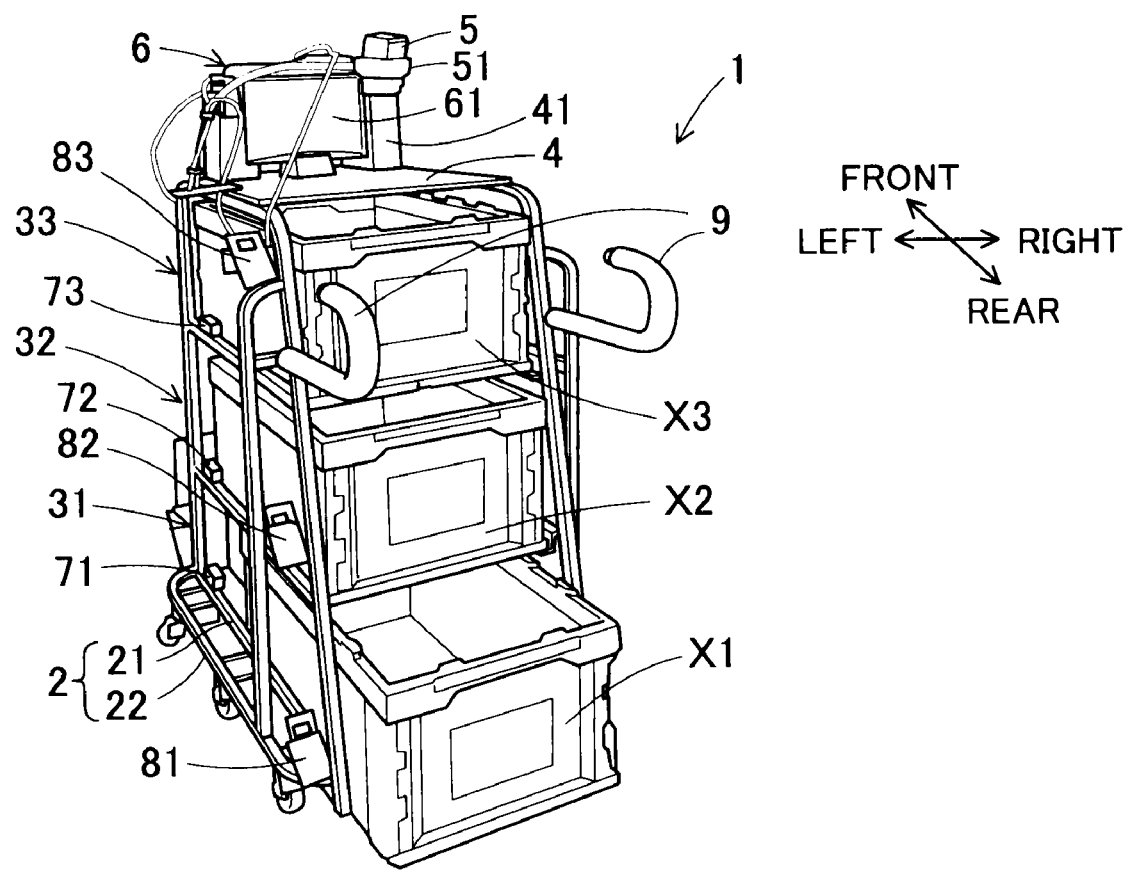
FIG. 1 is a perspective view of a picking cart of a preferred embodiment of the present invention.
Figure 2:
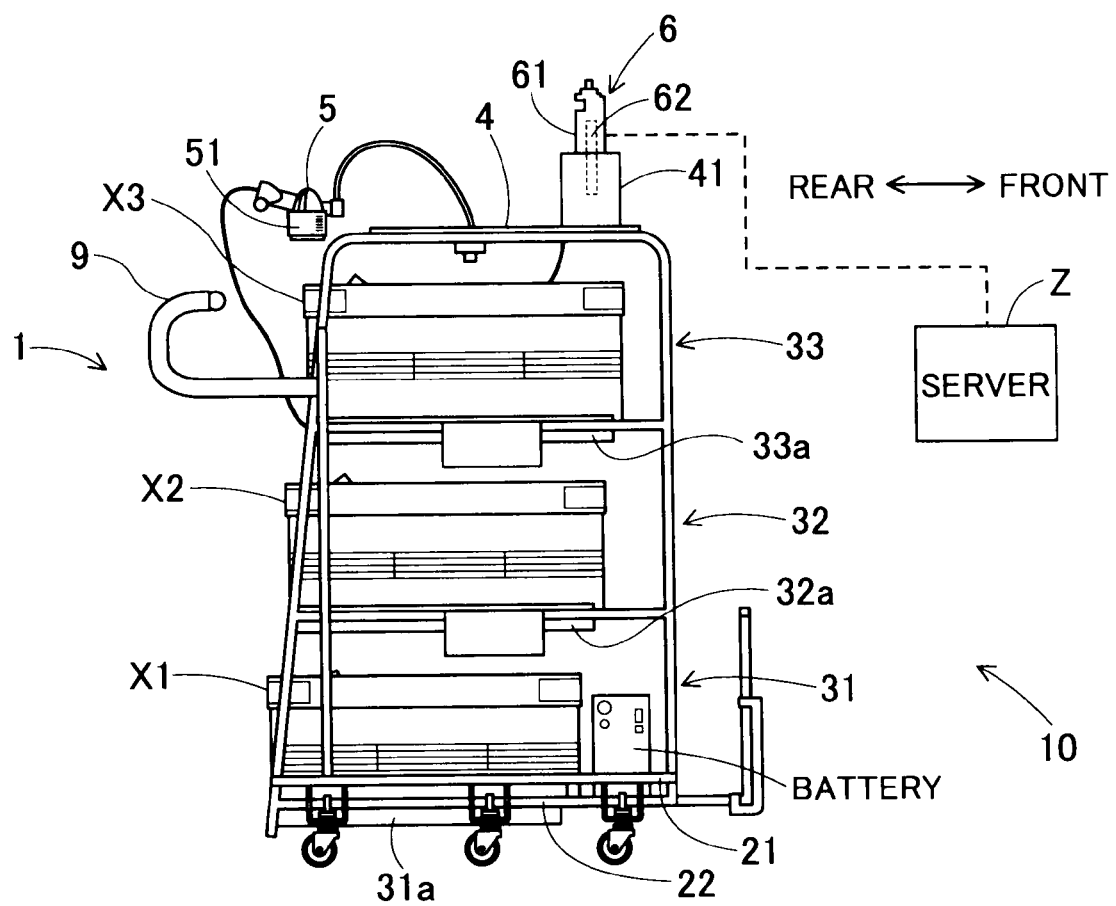
FIG. 2 is a side view of the picking cart.

As shown in FIGS. 1 and 2, the picking cart 1 comprises a base 2, storage shelves 31 to 33, a work table 4, a scanner 5, a client computer (hereinafter abbreviated as a computer) 6, sensors 71 to 73, draw indicators 81 to 83, and handles 9.

The base 2 is a bottom portion of the picking cart 1 and has wheels on a lower surface thereof. Specifically speaking, the base 2 has a frame portion 21 and wheel mounting portions 22. The frame portion 21 has a roughly rectangular shape and is constituted by a frame. The wheel mounting portions 22 are provided adjacently to both sides of the frame portion 21 and are located slightly above the frame portion 21. The wheels are mounted on a lower surface of each of the wheel mounting portions 22. A battery is placed in front of the base 2.

The storage shelf 31 is provided above the frame portion 21 of the base 2 and constituted by a frame which forms a roughly rectangular parallelepiped space. Shelf plates 31*a* each having an L-shaped cross section are respectively provided on both sides of lower side frames of the storage shelf 31, i.e., the frame portion 21 of the base 2. A foldable container (hereinafter abbreviated as a container) X1 is housed in the storage shelf 31 and placed on the shelf plates 31*a*. The container X1 is slidable (drawable) back and forth on the shelf plates 31*a*.

The storage shelf 32 has a similar structure to the storage shelf 31 and is provided just above the storage shelf 31. That is to say, the storage shelf 32 is constituted by a frame which forms a roughly rectangular parallelepiped space, and shelf plates 32*a*. The shelf plates 32*a* each having an L-shaped cross section are respectively provided on both sides of lower side frames of the storage shelf 32, i.e., upper side frames of the storage shelf 31. A container X2 is housed in the storage shelf 32 and placed on the shelf plates 32*a*. The container X2 is slidable (drawable) back and forth on the shelf plates 32*a*.

The storage shelf 33 has a similar structure to the storage shelves 31 and 32, and is provided just above the storage shelf 32. That is to say, the storage shelf 33 is constituted by a frame which forms a roughly rectangular parallelepiped space, and shelf plates 33*a*. The shelf plates 33*a* each having an L-shaped cross section are respectively provided on both sides of lower side frames of the storage shelf 33, i.e., upper side frames of the storage shelf 32. A container X3 is housed in the storage shelf 33 and placed on the shelf plates 33*a*. The container X3 is slidable (drawable) back and forth on the shelf plates 33*a*. The storage shelves 31 to 33 are designed so that a container placed on a lower storage shelf is located more rearward, i.e., on a nearer side. That is, the storage shelf 31 is located most rearward, i.e., on the nearest side.

Each of the containers X1 to X3 can be drawn or pushed in. It is noted that a front frame is provided so that each of the containers X1 to X3 cannot slide further forward once pushed in and housed in the corresponding one of the storage shelves 31 to 33. Moreover, each of the containers X1 to X3 are preliminarily assigned with a bar code indicating its own ID.

The work table 4 is a rectangular plate provided above the storage shelf 33. A stand 41 for installing the computer 6 is disposed on the work table 4.

The scanner 5 reads a bar code (article information) attached to an article. The scanner 5 also reads the bar codes of the containers X1 to X3 placed respectively on the storage shelves 31, 32 and 33. Specifically speaking, first the scanner 5 reads an ID of a container placed on the storage shelf 33, second reads an ID of a container placed on the storage shelf 32, and finally reads an ID of a container placed on the storage shelf 31. The scanner 6 is connected to the computer 6 and transmits the read information. The computer 6 recognizes that the container X1 is assigned to the storage shelf 31, the container X2 is assigned to the storage shelf 32 and the container X3 is assigned to the storage shelf 33.

The scanner 5 is placed on a scanner cradle 51 fixed to an upper frame of the storage shelf 33. The scanner cradle 51 has a through hole at a bottom center thereof. The scanner 5 can read bar codes even when placed on the scanner cradle 51. With the scanner 5 placed on the scanner cradle 51, a worker can perform scanning operations with both hands. The scanner 5 is connected to the computer 6 by cable and can also be used after taken out of the scanner cradle 51.

The computer 6 comprises a display unit 61 and a determination unit 62. The computer 6 is what is called a personal computer terminal having the display unit 61 at the front. The computer 6 transmits and receives picking and sorting data to and from the server Z located at a distance from the computer 6. The server Z stores article (goods) information and instruction information about picking and sorting (picking instruction information). The information in the server Z is updated as needed.

On receiving picking instruction information from the server Z, the computer 6 displays the picking instruction information on the display unit 61. Specifically speaking, the display unit 61 displays an article to be picked and its quantity, and a storage shelf to which the article is to be delivered. The computer 6 also transmits actual picking performance information to the server Z, based on signals from the scanner 5 and the sensors 71 to 73. The actual picking performance information is information indicating picking progress a worker has made.

The determination unit 62 determines whether or not one of the storage shelves 31 to 33 from which the container placed thereon has been drawn is identical to the storage shelf displayed on the display unit 61, based on signals (detection results) from the sensors 71 to 73. For example, when the display unit 61 displays the storage shelf 33 and a worker draws the container X3 from the storage shelf 33, the sensor 73 detects a draw and the determination unit 62 determines that they are "identical". On the other hand, for example, when the display unit 61 displays the storage shelf 33 and the sensor 72 detects a draw, the determination unit 62 determines that they are "not identical". When the determination unit 62 determines that they are not identical, the computer 6 generates an alarm sound and informs the worker of an error.

The determination unit 62 further determines whether or not article information read by the scanner 5 is identical to the article displayed on the display unit 61. When the determination unit 62 determines that they are "not identical", the computer 6 generates an alarm sound. When the determination unit 62 determines that an article picked and its quantity, and a storage shelf to which the article is being delivered are correct (identical to the information displayed on the display unit 61), the computer 6 displays next instruction information on the display unit 61.

The sensors 71 to 73 are optical sensors connected to the computer 6 and respectively provided at the storage shelves 31 to 33. The sensor 71 is provided in front of a lower side frame of the storage shelf 31. The sensor 71 detects whether or not there is the container X1 on the right side thereof. When the container X1 has been drawn rearward and is not located on the right side of the sensor 71, the sensor 71 detects it. That is to say, the sensor 71 detects whether or not the container X1 has been drawn from the storage shelf 31. The detection result is transmitted to the computer 6.

The sensor 72 is provided in front of a lower side frame of the storage shelf 32. The sensor 72 has a similar function to the sensor 71 and detects whether or not the container X2 has been drawn from the storage shelf 32. The sensor 73 is provided in front of a lower side frame of the storage shelf 33. The sensor 73 has a similar function to the sensors 71 and 72, and detects whether or not the container X3 has been drawn from the storage shelf 33.

Each of the draw indicators 81 to 83 is constituted by a plate and a lamp provided in front of the plate. The plate shows an ID mark of its corresponding storage shelf which is just the same as the display on the display unit 61. For example, when the storage shelf 33 is displayed as "A", "A" is written on the plate of the draw indicator 83. Each of the lamps is connected to the computer 6 and turned on based on the display on the display unit 61. The draw indicator 81 is provided on the left side of the storage shelf 31. An upper portion of the draw indicator 81 is angled forward so as to be easily seen by a worker. Based on the display (instruction information), the lamp of the draw indicator 81 is turned on when a storage shelf to which the article is to be delivered is the storage shelf 31 (the container X1) and turned off when the storage shelf to which the article is to be delivered is not the storage shelf 31.

Similarly, the draw indicator 82 is provided on the left side of the storage shelf 32. An upper portion of the draw indicator 82 is angled forward so as to be easily seen by a worker. Based on the display, the lamp of the draw indicator 82 is turned on when a storage shelf to which the article is to be delivered is the storage shelf 32 (the container X2) and turned off when the storage shelf to which the article is to be delivered is not the storage shelf 32. The draw indicator 83 is provided on the left side of the storage shelf 33. An upper portion of the draw indicator 83 is angled forward so as to be easily seen by a worker. Based on the display, the lamp of the draw indicator 83 is turned on when a storage shelf to which the article is to be delivered is the storage shelf 33 (the container X3) and turned off when the storage shelf to which the article is to be delivered is not the storage shelf 33. For better visibility, the draw indicators 81 to 83 form a greater angle with vertical line as they are located lower. That is, the draw indicator 81 forms the greatest angle with vertical line. By providing the draw indicators 81 to 83 to the storage shelves 31 to 33 respectively, it is possible to prevent a worker from making draw errors. The handles 9 are provided on a rear frame of the picking cart 1. A worker grips the handles 9 and transfers the picking cart 1.

Figure 3:
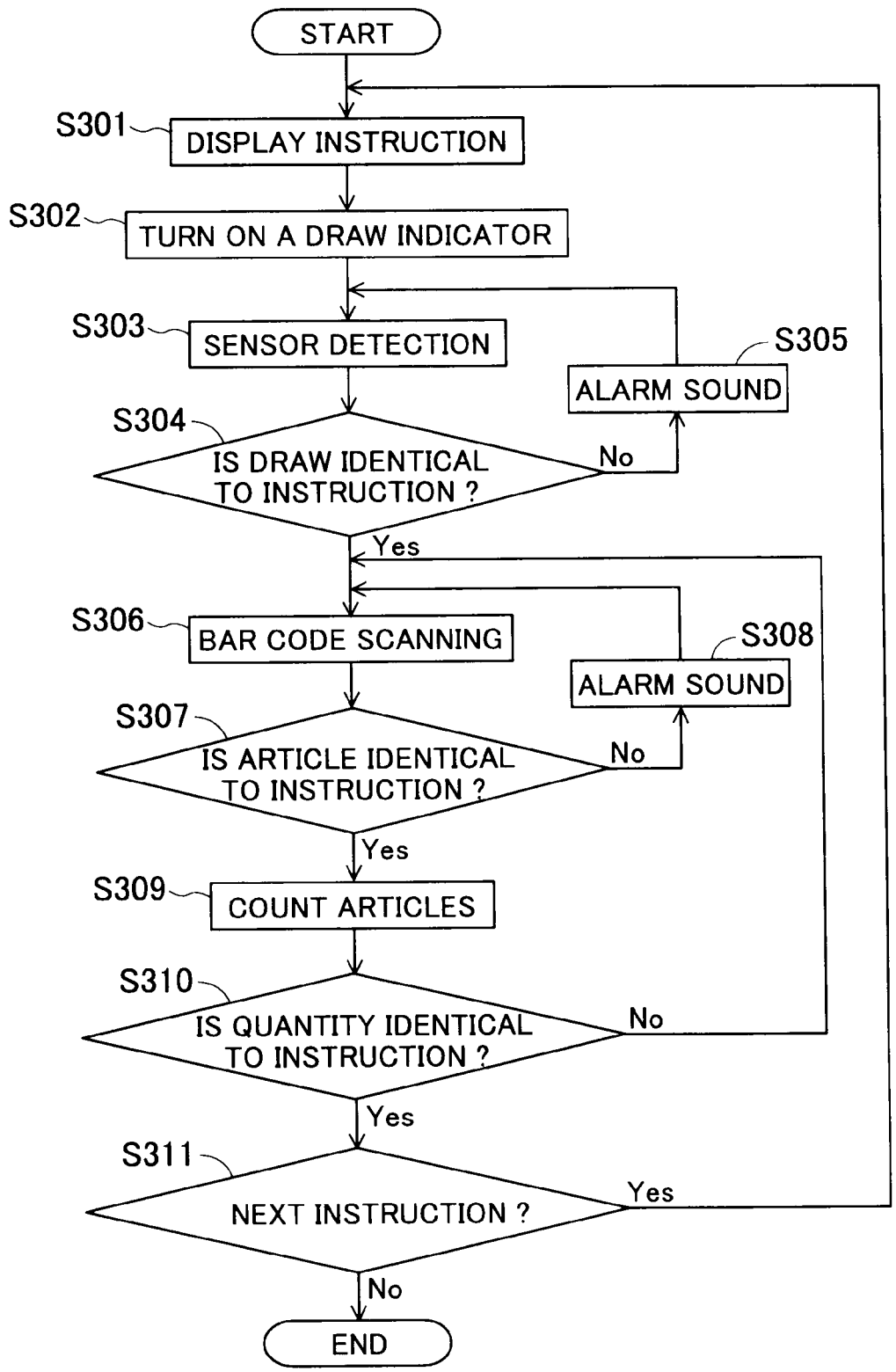
FIG. 3 is a processing flow chart of the picking cart.

Now, a processing flow of this preferred embodiment will be described referring to FIG. 3. First, the computer 6 displays picking instruction information on the display unit 61 based on data from the server Z (S301). Then, the computer 6 turns on the lamp of one of the draw indicators 81 to 83 corresponding to the picking instruction information (S302). It is noted that a worker can transfer the picking cart 1 as needed to a position where an article to be picked and sorted can be picked.

Then a worker draws a container. Each of the sensors 71 to 73 detects whether its corresponding container has been drawn or not (S303). Detection results are transmitted to the determination unit 62 and the determination unit 62 determines whether or not the storage shelf indicated by the detection results is identical to the picking instruction information (S304).

When the determination unit 62 determines that they are not identical (S304: No), an alarm sound is generated (S305). The alarm sound is stopped by returning the wrongly drawn container to its original position. When the determination unit 62 determines that they are identical (S304: Yes), an alarm sound is not generated and the worker picks an article to be picked and sorted and has the scanner 5 read a bar code of the article (S306).

The information read by the scanner 5 is transmitted to the determination unit 62, and the determination unit 62 determines whether or not the read article information is identical to the picking instruction information (S307). When the determination unit 62 determines that they are not identical (S307: No), an alarm sound is generated for a certain time (S308). The number of articles picked by mistake is not counted and the count value is cleared.

The determination unit 62 determines that they are identical (S307: Yes), the number of articles is counted (S309). Then, the determination unit 62 determines whether or not the number of articles is identical to the picking instruction information (S310). When the determination unit 62 determines that they are identical (S310: Yes), the computer 6 confirms whether or not there is a next instruction (S311). When the computer 6 confirms that there is a next instruction (S311: Yes), next picking instruction information is displayed on the display unit 62 (S301). When the determination unit 62 determines that they are not identical (S310: No), the computer 6 waits for next information read by the scanner 5. It is noted that S303 and S304 can be carried out after S306 and S307. That is to say, a worker can have the scanner 5 read article information before drawing a container.

As mentioned above, according to the picking cart 1 of this preferred embodiment, it is possible to know whether or not sorting has been carried out just as displayed in a previous step to placing an article into a container. That is to say, whether there is a sorting error or not is determined before placing an article. Therefore, article misplacement by a worker can be prevented. According to the present invention, it is possible to improve sorting precision and operating efficiency.

It is noted that the abovementioned alarm sound can be a voice, for example, saying "It's wrong". Moreover, the computer 6 can announce by voice the picking instruction information on the display unit 61 to a worker. An article displayed on the display unit 61 can be displayed by an image of the article. Any scanner is employable as the scanner 5 as long as it can read unique information attached to an article or a container.

Here, this preferred embodiment can be grasped as a picking system. That is to say, the picking system 10 of this preferred embodiment comprises the picking cart 1 and the server Z. According to this system, it is possible to improve sorting precision and operating efficiency.

The present invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A picking cart, comprising:
   a base having wheels on a lower part thereof,
   a plurality of storage shelves provided above the base, at least one of which is assigned with a container for storing a picked article and has the container placed thereon in a drawable manner,
   a display unit for displaying at least an article to be picked and one of the storage shelves to which the article is to be delivered,
   a sensor unit for detecting whether or not the container placed thereon has been drawn from each of the storage shelves, and
   a determination unit for determining whether or not one of the storage shelves from which the container placed thereon has been drawn is identical to the storage shelf displayed on the display unit, based on the detection result of the sensor unit.

2. The picking cart according to claim 1, wherein the sensor unit is optical sensors respectively provided at the storage shelves.

3. The picking cart according to claim 1, wherein each of the storage shelves is provided with a draw indicator for indicating whether the container placed thereon should be drawn or not, based on the storage shelf displayed on the display unit.

4. The picking cart according to claim 2, wherein each of the storage shelves is provided with a draw indicator for indicating whether the container placed thereon should be drawn or not, based on the storage shelf displayed on the display unit.

5. A picking system, comprising:
the picking cart according to claim 1;
a server which stores article information and picking and sorting instruction information; and
a client computer which transmits and receives data to and from the server,
the display unit of the picking cart being a display unit of the client computer.

6. A picking system, comprising:
the picking cart according to claim 2;
a server which stores article information and picking and sorting instruction information; and
a client computer which transmits and receives data to and from the server,
the display unit of the picking cart being a display unit of the client computer.

7. A picking system, comprising:
the picking cart according to claim 3;
a server which stores article information and picking and sorting instruction information; and
a client computer which transmits and receives data to and from the server,
the display unit of the picking cart being a display unit of the client computer.

8. A picking system, comprising:
the picking cart according to claim 4;
a server which stores article information and picking and sorting instruction information; and
a client computer which transmits and receives data to and from the server,
the display unit of the picking cart being a display unit of the client computer.

* * * * *